(12) United States Patent
Markman et al.

(10) Patent No.: US 9,397,772 B2
(45) Date of Patent: Jul. 19, 2016

(54) RELIABLE DIVERSITY ARCHITECTURE FOR A MOBILE DTV SYSTEM

(75) Inventors: Ivonete Markman, Carmel, IN (US); Aaron Reel Bouillet, Noblesville, IN (US); Scott Matthew LoPresto, Chicago, IL (US)

(73) Assignee: Thomson Licensing, Issy les Moulineaux (FR)

( * ) Notice: Subject to any disclaimer, the term of this patent is extended or adjusted under 35 U.S.C. 154(b) by 656 days.

(21) Appl. No.: 13/511,692

(22) PCT Filed: Dec. 3, 2009

(86) PCT No.: PCT/US2009/006369
§ 371 (c)(1),
(2), (4) Date: May 24, 2012

(87) PCT Pub. No.: WO2011/068497
PCT Pub. Date: Jun. 9, 2011

(65) Prior Publication Data
US 2012/0269277 A1    Oct. 25, 2012

(51) Int. Cl.
*H04N 7/64* (2006.01)
*H04H 60/11* (2008.01)
*H04L 1/00* (2006.01)
*H04H 40/18* (2008.01)

(52) U.S. Cl.
CPC ............. *H04H 60/11* (2013.01); *H04L 1/0057* (2013.01); *H04H 40/18* (2013.01)

(58) Field of Classification Search
CPC . H03M 13/3938; H03M 13/15; H03M 13/27; H03M 13/2918; H03M 13/2921; H03M 13/2957; H03M 13/2966; H03M 13/31; H03M 13/1515; H04N 19/00781; H04N 19/00884; H04N 21/23608; H04N 21/2383; H04N 21/4344; H04N 21/226; H04N 7/64; H04H 60/11; H04L 1/004
USPC ............. 375/240.16, 240.27, 240.24, 240.01; 717/157; 348/51
See application file for complete search history.

(56) References Cited

U.S. PATENT DOCUMENTS 9,106,376 B2 *    8/2015  Hwang  ................... H04L 1/004
2004/0223551 A1 *  11/2004  Hannuksela ..... H04N 21/23406
                                                     375/240.25

(Continued)

FOREIGN PATENT DOCUMENTS

WO    WO2009064468    5/2009

*Primary Examiner* — Richard Torrente
*Assistant Examiner* — Habib Irfan
(74) *Attorney, Agent, or Firm* — Brian J. Dorini; Jerome G. Schaefer; Ivonete Markman

(57) ABSTRACT

A digital data stream comprises alternating groups of information blocks and groups of parity blocks, each group of information blocks includes multiple information blocks and each group of parity blocks includes multiple parity blocks. An apparatus for receiving a digital data stream comprises a demodulator that receives and demodulates a digital data stream. An equalizer compensates for distortions in the digital data stream. A delay buffer generates a first stream of digital data representing the compensated digital data stream and a second stream of digital data representing a delayed version of the compensated digital data stream. A forward error correction block receives and processes the first and second streams of digital data from the delay buffer, and outputs an error corrected stream of digital data. A transport block receives and processes the error corrected stream from the forward error correction block for display.

20 Claims, 12 Drawing Sheets

(56) References Cited

U.S. PATENT DOCUMENTS

| | | |
|---|---|---|
| 2005/0008065 A1 | 1/2005 | Schilling |
| 2005/0125562 A1* | 6/2005 | Bhardwaj ............. H04L 12/437 709/249 |
| 2008/0059866 A1 | 3/2008 | Song et al. |
| 2010/0183077 A1* | 7/2010 | Lee ........................ H04N 19/61 375/240.24 |
| 2010/0195712 A1* | 8/2010 | Yu .......................... H04N 19/61 375/240.01 |
| 2010/0321478 A1* | 12/2010 | Sliwa .................. G02B 27/2271 348/51 |
| 2012/0269277 A1* | 10/2012 | Markman .............. H04H 60/11 375/240.27 |
| 2012/0317461 A1* | 12/2012 | Hwang ............. H03M 13/2906 714/776 |
| 2013/0227376 A1* | 8/2013 | Hwang ............. H03M 13/2906 714/776 |
| 2014/0314158 A1* | 10/2014 | Hwang ................. H04L 1/0041 375/240.27 |

* cited by examiner

FEC ENCODER

RELIABLE DIVERSITY ARCHITECTURE FOR A MOBILE DTV SYSTEM

CROSS REFERENCE TO RELATED APPLICATIONS

This application claims the benefit, under 35 U.S.C. §365 of International Application PCT/US2009/006369, filed Dec. 3, 2009, which was published in as WO 2011/068497 accordance with PCT Article 21(2) on Jun. 9, 2011 in English.

FIELD

The present arrangement relates to mobile DTV systems and more specifically to a reliable diversity architecture for a time diversity mobile DTV system.

BACKGROUND

The Advanced Television Systems Committee (ATSC) standard for Digital Television (DTV) in the United States requires an 8-Vestigial Sideband (VSB) transmission system which includes Forward Error Correction (FEC) as a means of improving the system performance. The FEC system consists of a Reed-Solomon encoder, followed by a byte interleaver, and a trellis encoder on the transmitter side. At the receiver end, there is a corresponding trellis decoder, byte deinterleaver and Reed-Solomon decoder. The ATSC-DTV standard is document A53.doc, dated Sep. 16, 1995 produced by the United States Advanced Television Systems Committee. FIG. 1 shows a simplified block diagram of the DTV transmitter and receiver, emphasizing the FEC system.

The ATSC has started a study group to create a new M/H (mobile/handheld) DTV standard that is backwards compatible with the current DTV standard (A/53), more robust, more flexible, and provides expanded services to customers utilizing mobile and handheld devices. The new proposals have added a new layer of FEC coding and more powerful decoding algorithms to decrease the Threshold of Visibility (TOV).

The added layer of FEC coding requires decoding techniques such as turbo decoding discussed in an article by C. Berrou, A. Glavieux and P. Thitimajshima, entitled "Near Shannon Limit Error—Correcting Coding and Decoding: Turbo-Codes," found in Proceedings of the IEEE International Conference on Communications—ICC'93, May 23-26, 1993, Geneva, Switzerland, pp. 1064-1070. A discussion of turbo coding can be found in the article by M. R. Soleymani, Y. Gao and U. Vilaipornsawai, entitled "Turbo Coding for Satellite and Wireless Communications," Kluwer Academic Publishers, USA, 2002.

Decoding of signals encoded for ATSC DTV with an added FEC layer can also involve trellis decoding algorithms like maximum a posteriori (MAP) decoders as described by L. R. Bahl, K. Cocke, F. Jelinek and J. Rariv, in an article entitled "Optimal Decoding of Linear Codes for Minimizing Symbol Error Rate," found in IEEE Transactions on Information Theory, Vol. IT-20, No. 2, March 1974, pp. 284-287. Another discussion of trellis coders and a MAP decoder is found in an article written by A. J. Viterbi, entitled "An Intuitive Justification and a Simplified Implementation of the Map Decoder for Convolutional Codes," found in IEEE Journal on Selected Areas in Communications, Vol. 16, No. 2, February 1998, pp. 260-264.

In addition, the FEC system may allow for transmission with time diversity as described by International Patent Applications WO 2008/144004 and 2009/064468. Time diversity may advantageously be used in digital communication systems to minimize the effect of error bursts due to various transmission channel conditions. Error bursts are typically caused by fading from a moving receiver, an obstacle, or electromagnetic interference. Although the proposed systems attempt to provide backwards compatibility with the current DTV standard, no other known system permit diversity within their coding structure.

This arrangement proposes a transmitter signaling scheme and receiver architecture for taking advantage of a time diversity system.

SUMMARY

A digital data stream comprises alternating groups of information blocks and groups of parity blocks, each group of information blocks includes a plurality of information blocks and each group of parity blocks includes a plurality of parity blocks. An apparatus for receiving a digital data stream comprises a demodulator that receives a digital data stream and demodulates the digital data stream. An equalizer compensates for distortions in the digital data stream to generate a compensated digital data stream. A delay buffer generates a first stream of digital data representing the compensated digital data stream and a second stream of digital data representing the compensated digital data stream delayed for a predetermined period. A forward error correction block receives and processes the first and second streams of digital data from the delay buffer, and outputs an error corrected stream of digital data. A transport block receives and processes the error corrected stream from the forward error correction block for display.

The apparatus further includes a plurality of forward error correction cores, where a first core of the plurality of forward error correction cores comprises a first subcore that processes the first stream of digital data. A second subcore processes the second stream of digital data. A stagger multiplexer generates a combined stream of digital data from the first and second processed streams of digital data. A stagger demultiplexer processes the combined stream of digital data to generate two streams of extrinsic digital data. The first subcore further processes one stream of extrinsic digital data to output a third digital data stream. The second subcore further processes the other stream of extrinsic digital data to output a fourth digital data stream. The first and third streams are provided to a first subcore of a subsequent forward error correction core of the plurality of forward error correction cores. The second and fourth streams are provided to a second subcore of the subsequent forward error correction core.

The stagger multiplexer generates a first intermediate stream by extracting groups of parity blocks from the first stream of digital data and inserting a zero block in place of each group of parity blocks and generates a second intermediate stream by extracting groups of information blocks from the second stream of digital data and inserting a zero block in place of each group of information blocks. The combined stream of digital data is generated by alternately extracting an individual information block from the first intermediate stream of digital data and an individual parity block from the second intermediate stream of digital data.

The stagger demultiplexer generates the one stream of extrinsic digital data by extracting individual information blocks from the combined stream of digital data to form groups of information blocks with zero blocks between each group of information blocks and generates the other stream of extrinsic digital data by extracting individual parity blocks from the combined stream of digital data to form groups of parity blocks with zero blocks between each group of parity blocks.

Each of the plurality of forward error correction cores comprises a first subcore that processes the first and third streams of digital data. A second subcore processes the second and fourth streams of digital data. A stagger multiplexer generates a combined stream of digital data from the first and second processed streams of digital data. A stagger demultiplexer processes the combined stream of digital data to generate two streams of extrinsic digital data. The first subcore further processes one stream of extrinsic digital data to output a third digital data stream. The second subcore further processes the other stream of extrinsic digital data to output a fourth digital data stream. The first and third streams are provided to a first subcore of a subsequent forward error correction core of the plurality of forward error correction cores. The second and fourth streams are provided to a second subcore of the subsequent forward error correction core.

The forward error correction block further comprises a last core comprising a first subcore that processes the first and third streams of digital data. A second subcore processes the second and fourth streams of digital data. A stagger multiplexer generates a combined stream of digital data from the first and second processed streams of digital data. A decoding block processes the combined stream of digital data and outputs the combined stream of digital data as the error corrected stream of digital data.

The forward error correction block further comprises a forward error correction core that processes the first and second streams of digital data to generate a reencoded data stream, the reencoded data stream being provided to the equalizer.

A method for receiving a digital data stream comprising alternating groups of information blocks and groups of parity blocks, each group of information blocks including a plurality of information blocks and each group of parity blocks including a plurality of parity blocks comprises demodulating the digital data stream and compensating the demodulated digital data stream for distortions. A delay buffer generates a first stream of digital data representing the compensated digital data stream and a second stream of digital data representing the compensated digital data stream delayed for a predetermined delay period. A forward error correction block processes the first and second streams of digital data to generate an error corrected stream of digital data. The error corrected stream of digital data is transmitted for display.

The step of processing comprises processing the first and second streams of digital data with a plurality of forward error correction cores. The processing further comprises processing the first and second streams of digital data. A stagger multiplexer generates a combined stream of digital data from the first and second processed streams. A stagger demultiplexer generates two streams of extrinsic digital data from the combined stream of digital data. The first subcore processes one stream of extrinsic digital data to output a third digital data stream. The second subcore processes the other stream of extrinsic digital data to output a fourth digital data stream. The first and third streams are output to a first subcore of one of a plurality of forward error correction cores. The second and fourth streams are output to a second subcore of the one of the plurality of forward error correction cores.

Generating, in a stagger multiplexer, comprises extracting groups of parity blocks from the first stream of digital data and inserting a zero block in place of each group of parity blocks to form a first intermediate stream of digital data. Groups of information blocks are extracted from the second stream of digital data with a zero block inserted in place of each group of information blocks to form a second intermediate stream of digital data. An individual block from the first intermediate stream of digital data and an individual parity block from the second intermediate stream of digital data are alternately extracted and combined to form the combined stream of digital data.

Generating, in a stagger demultiplexer, comprises extracting individual information blocks from the combined stream of digital data to form groups of information blocks and placing zero blocks between each group of information blocks to generate one stream of extrinsic data. Individual parity blocks are extracted from the combined stream of digital data to form groups of parity blocks and placing zero blocks between each group of parity blocks to generate the other stream of extrinsic data.

Additional features and advantages of the arrangement are apparent from the following detailed description of illustrative embodiments which proceeds with reference to the accompanying figures.

BRIEF DESCRIPTION OF THE DRAWINGS

FIG. 6 depicts an example a Packet Interleaver taking bytes from a fixed number of consecutive packets in a row-by-row order, and outputting the bytes column-by-column;

FIG. 7 depicts an example of a Packet Deinterleaver taking bytes from resulting block code codewords for the original group of packets in a column-by-column order and outputting the bytes in a row-by-row order;

DETAILED DESCRIPTION OF THE EMBODIMENTS

Figure 1:
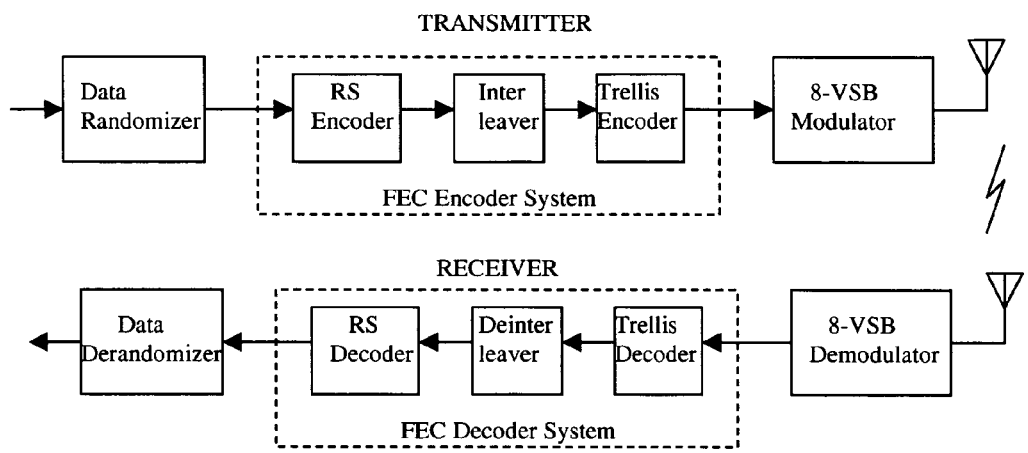
FIG. 1 depicts an example block diagram of a digital television transmitter and receiver system.

FIG. 1 shows an example of a DTV system that incorporates forward error correction. Input digital data, which may be considered any of video, audio, textual, or other information data, is encoded using a DTV standard and transmitted to a receiver which decodes the digital data.

Figure 2:
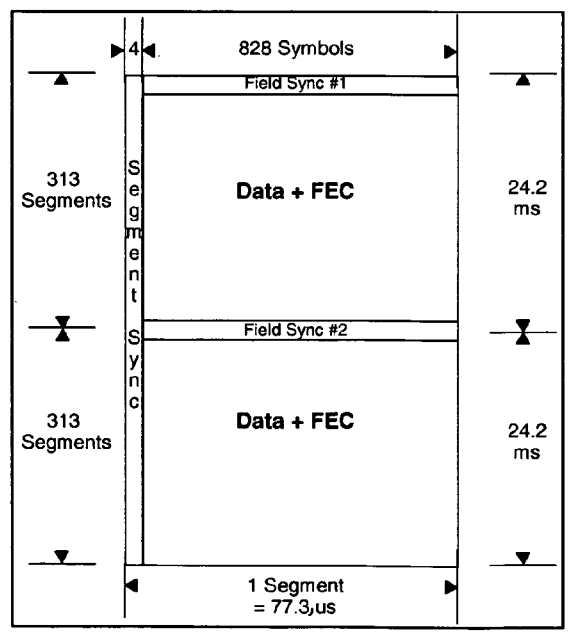
FIG. 2 depicts an example digital television data frame.

FIG. 2 shows an exemplary DTV data frame organized for transmission. Each data frame may include two data fields, each containing 313 data segments. The first data segment of each data field may be a unique synchronizing segment (Data Field Sync). The remaining 312 data segments may each carry the equivalent of one 188-byte MPEG-compatible transport packet and its associated FEC data.

Each data segment may consist of 832 8-VSB symbols. The first four symbols of each data segment, including the Data Field Sync segments, form a binary pattern and provide segment synchronization. The first four 8-VSB symbols of each data segment have values of +5, −5, −5, and +5. This four-symbol data segment sync signal also represents the sync byte of each 188-byte MPEG-compatible transport packet conveyed by each of the 312 data segments in each data field. The remaining 828 symbols of each data segment carry data equivalent to the remaining 187 bytes of a transport packet and its associated FEC data.

Figure 3:
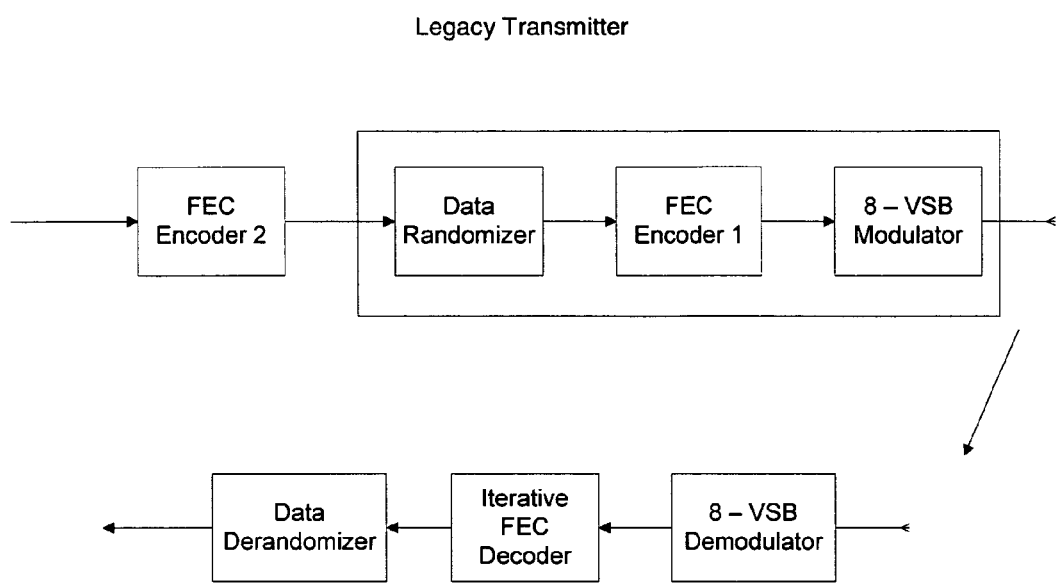
FIG. 3 depicts an example of a DTV M/H system in accordance with the principles of the current arrangement.

FIG. 3 shows a simplified block diagram of an exemplary transmitter and receiver for an M/H DTV system, hereby called DTV-M/H, wherein the added layer of FEC encoding, exemplified by FEC Encoder 2, may includes a packet block code and FEC Encoder 1 is compatible with the ATSC FEC encoder shown in FIG. 1. At the receiver, the Iterative FEC Decoder performs turbo decoding of the various FEC encoders. The Iterative FEC decoder in question may includes MAP decoding of the ATSC trellis decoder and the added FEC codes within FEC Encoder 2 which will iteratively interact, resulting in each decoder sending extrinsic information to the other. In addition, the Iterative FEC Decoder will perform a number of iterations M deemed necessary to achieve a desired system performance.

Figure 4:
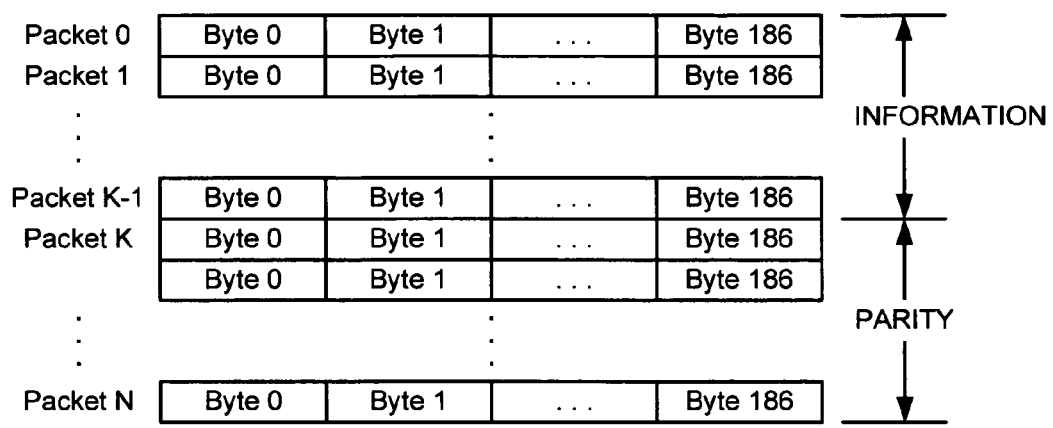
FIG. 4 depicts an example packet structure of a packet block code of code rate R=K/N in accordance with the principles of the current arrangement.

FIG. 4 shows a packet structure of a Packet Block Code having a rate R=K/N in accordance with the principles of the current arrangement. The block code is such that for each K packets of data, having 187 information bytes (assuming MPEG packets without the sync byte, 0x47 or 47 Hex, as in the ATSC standard), the block code adds N−K parity packets. This block code may be a Serial Concatenated Block Code (SCBC) over a Galois Field GF(256) similar to that described in International Patent Application WO 2008/144004 mentioned above, wherein each column in FIG. 3 would be a separate code word of N bytes associated with the first K information bytes.

Figure 5:
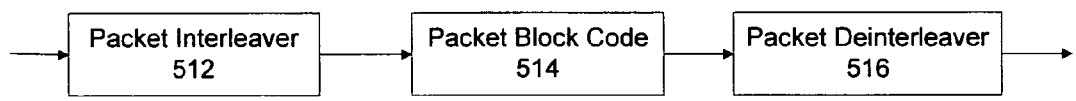
FIG. 5 depicts an example of a second FEC encoder.

FIG. 5 shows an FEC Encoder according to the present arrangement. FEC block encoder 514 may be preceded by a packet interleaver 512 and followed by a packet deinterleaver 516. The operation of packet interleaver 512 and packet deinterleaver 516 are set forth more specifically hereinafter with reference to FIGS. 6 and 7, respectively.

Figures 6A, 6B:
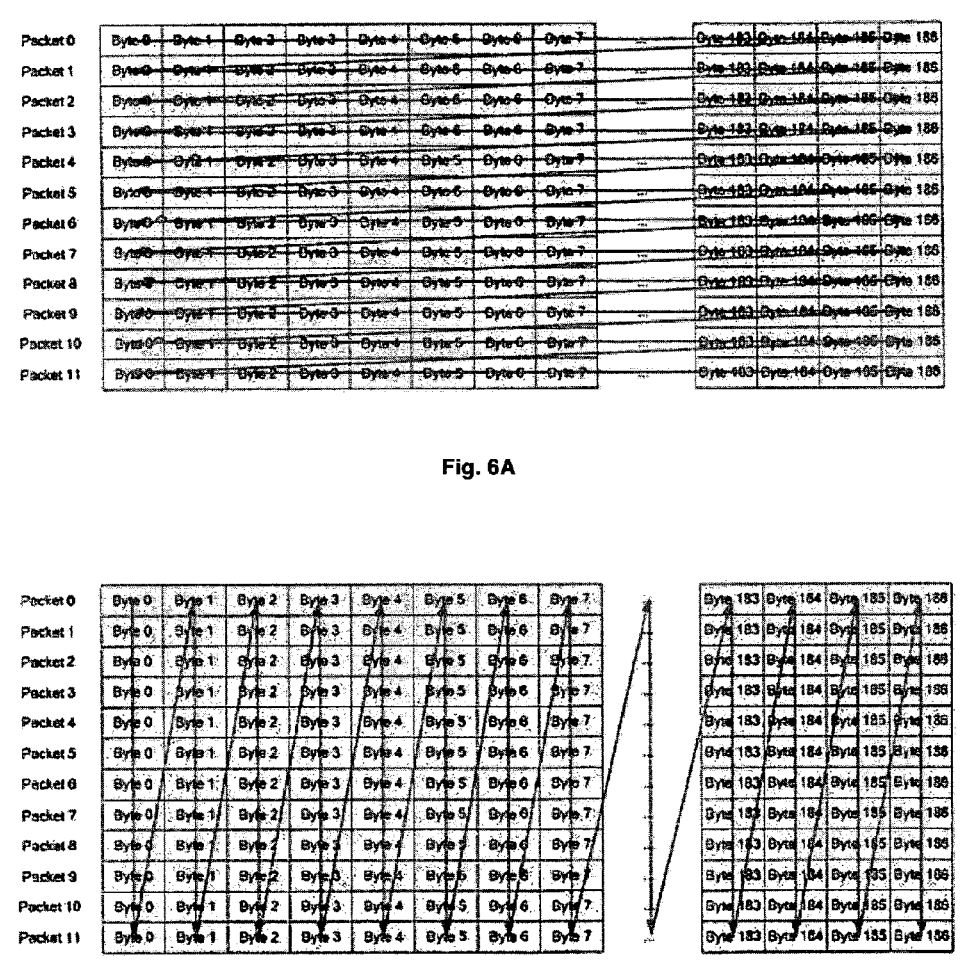

The Packet Interleaver 512 may take bytes from a fixed number of consecutive packets in a row-by-row order as shown in FIG. 6A, and outputs the bytes column-by-column, as shown in FIG. 6B, for the case of R=12/26. In this manner, all first bytes of the packets will be grouped together, all second bytes of the packets will be grouped together, and so on to the last bytes of the packets. Each source packet is an MPEG transport stream packet with the 0x47 sync byte removed, as in the A/53 ATSC DTV standard. As a result each packet has a length of 187 bytes. The number of packets in each code frame is the same as the number of source symbols required for the GF(256) Serial Concatenated Block Code. The Packet Interleaver is known in the art as a (K, 187) matrix interleaver.

Figures 7A, 7B:
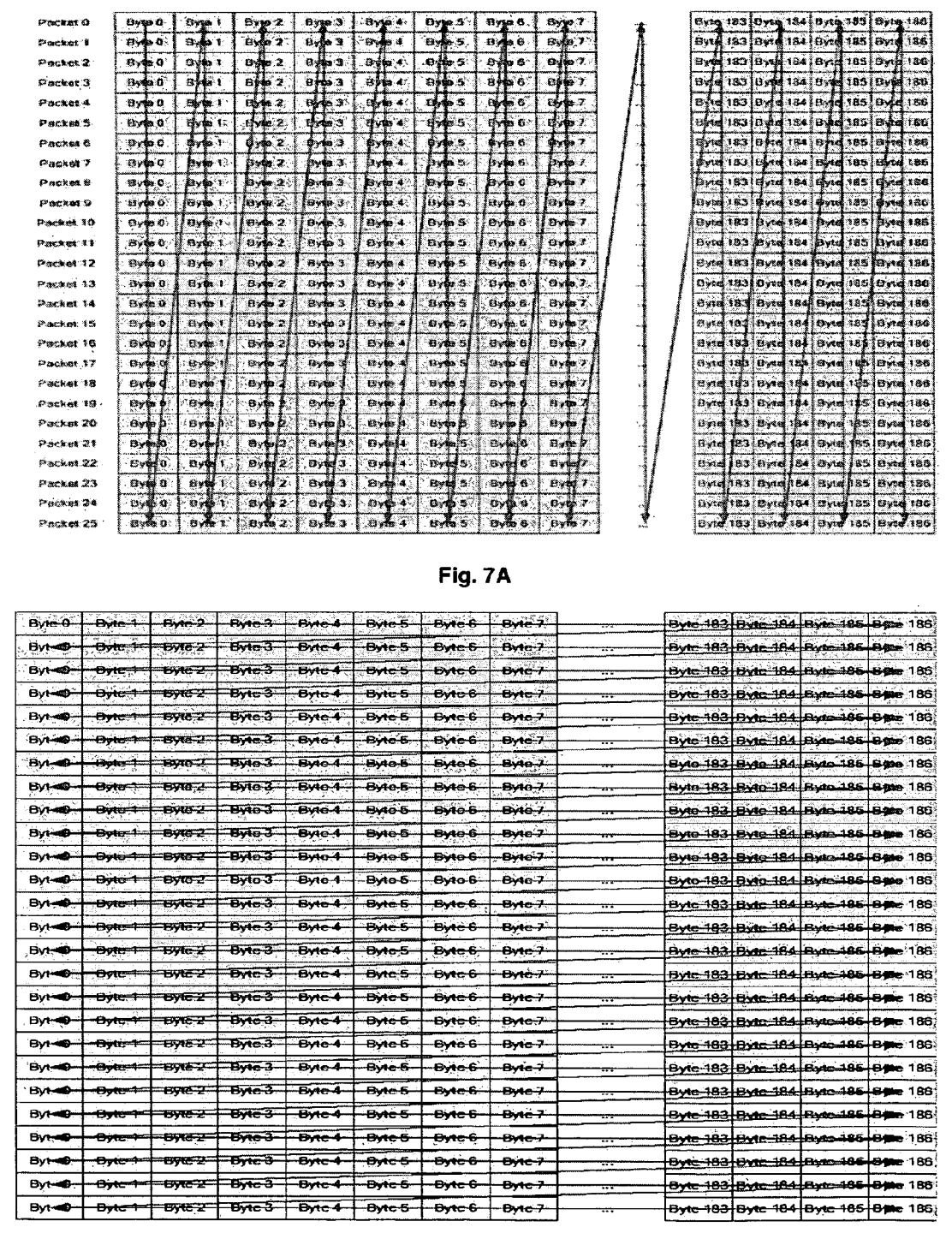

The Packet Deinterleaver 516 may take bytes from the resulting SCBC codewords for the original group of packets in a column-by-column order as shown in FIG. 7A. The bytes are then output row-by-row, as shown in FIG. 7B, for the case of R=12/26. In this manner, the original packets are reconstituted and new packets are created from the parity bytes of the SCBC codewords. Each packet corresponds to a common GF(256) symbol location in all created SCBC codewords. The Packet Deinterleaver is specified as a (N, 187) matrix deinterleaver An example of a burst repetitive data structure for transmission of the DTV_M/H data is given in Table 1. The DTV M/H receiver discards the Legacy ATSC data segments or packets, and works on the remaining data, which includes training data, also called a priori tracking (APT) packets, in addition to the synchronization data present in the ATSC-DTV data frame described above. This preamble training data, however, is fully encoded by all levels of legacy ATSC FEC coding in the system (FEC encoder 1), as well as being interleaved and randomized. An example of a burst repetitive data structure for transmission of the DTV-M/H data is given in Table 1.

TABLE 1

| DTV-M/H Data Structure | |
|---|---|
| Data Field F0 | ATSC Field Sync |
| | 156 DTV-M/H Data and Preamble Segments |
| | 156 Legacy ATSC Data Segments |
| Data Field F1 | ATSC Field Sync |
| | 312 Legacy ATSC Data Segments |
| Data Field F2 | ATSC Field Sync |
| | 312 Legacy ATSC Data Segments |

As shown in Table 1, a data burst comprising three data fields, F0, F1 and F2, is repetitively transmitted, each corresponding to 1.5 frame of the legacy ATSC-DTV standard.

When receiving a data burst such as set forth in Table 1, a DTV-M/H receiver will discard the 156 Legacy ATSC data segments in Data Field F0 and process the remaining data including the preamble training data segments. The preamble training data is to be utilized by the DTV-M/H receiver in order to enhance performance.

Figure 8:
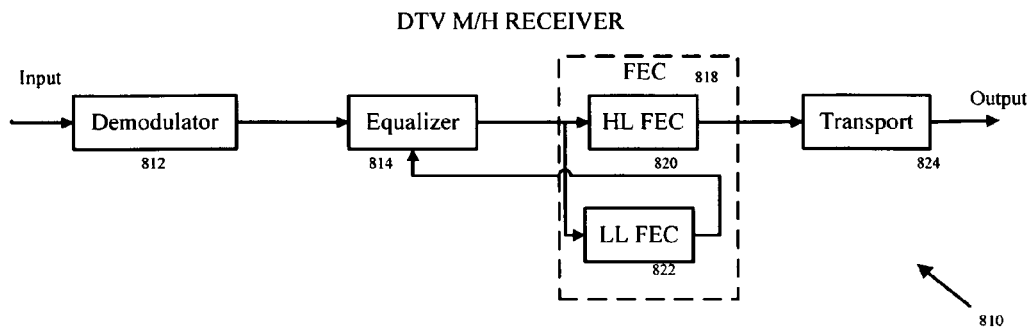
FIG. 8 depicts an example of a receiver implementation for a mobile DTV system according to the present arrangement.

FIG. 8 shows a general block diagram of a receiver implementation for a mobile DTV receiver 810 used in the present arrangement. The receiver 810 is generally composed of a demodulator 812, equalizer 814, FEC decoding block 818 and transport function block 824, which includes video decoding. One skilled in the art will be familiar with the general functionality of these blocks in a DTV receiver. In this particular mobile system, the FEC decoder has two levels: High Latency (HL) 820, which has N iterations or cores and feeds the transport block, and Low Latency (LL) 822 with M<N iterations or cores, which feeds the equalizer to increase its performance.

Figure 9:
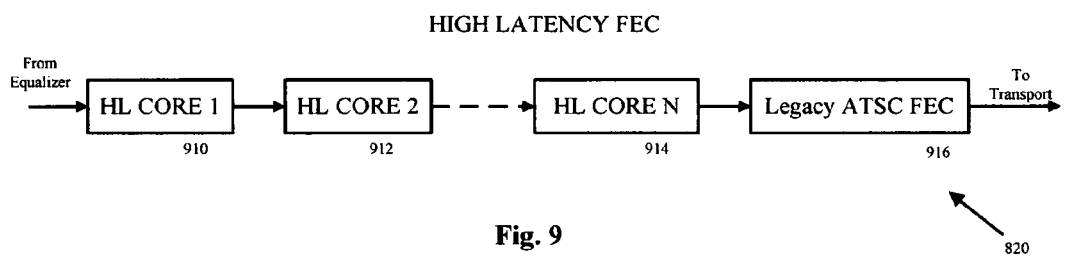
FIG. 9 depicts an example of the High Latency FEC (HL FEC) according to the present arrangement.

FIG. 9 shows a more detailed diagram of HL FEC 820. Forward error correction in a system provides for error control for data transmissions. This is performed by sending redundant data to its messages, known as error correction codes that allow the receiver to detect and correct errors without the need to ask the sender for additional data or resending of data. HL FEC 820 has a plurality of HL Cores represented by HL Core 1 910, HL Core 2 912, and HL Core N 914, and as a last block, a legacy ATSC FEC block 916. Legacy ATSC FEC Block 916 includes a combination of the legacy FEC functions associated with the legacy ATSC decoder in FIG. 1, including particularly, an RS decoder, derandomizer and data interface to the transport block.

Figure 10:
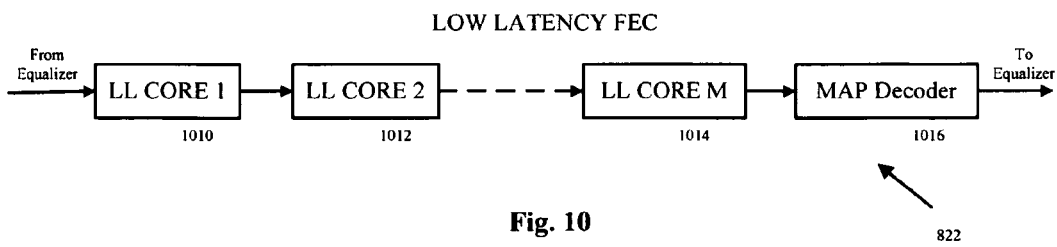
FIG. 10 depicts an example of the Low Latency FEC (LL FEC) according to the present arrangement.

FIG. 10 shows a more detailed diagram of LL FEC 822. LL FEC 822 has as a last block, a trellis or MAP decoder 1016, since it is feeding 8-VSB symbols to the equalizer. LL FEC 722 also has a plurality of LL Cores represented by LL Core 1 1010, LL Core 2 1012, and LL Core M 1014. The main difference between the HL and LL cores is the latency of the core blocks. Since the LL FEC 822 feeds the equalizer 814 of FIG. 8, its functionality must be designed for minimum latency, and therefore, it is not as robust as the HL FEC 820 in performance.

Figure 11:
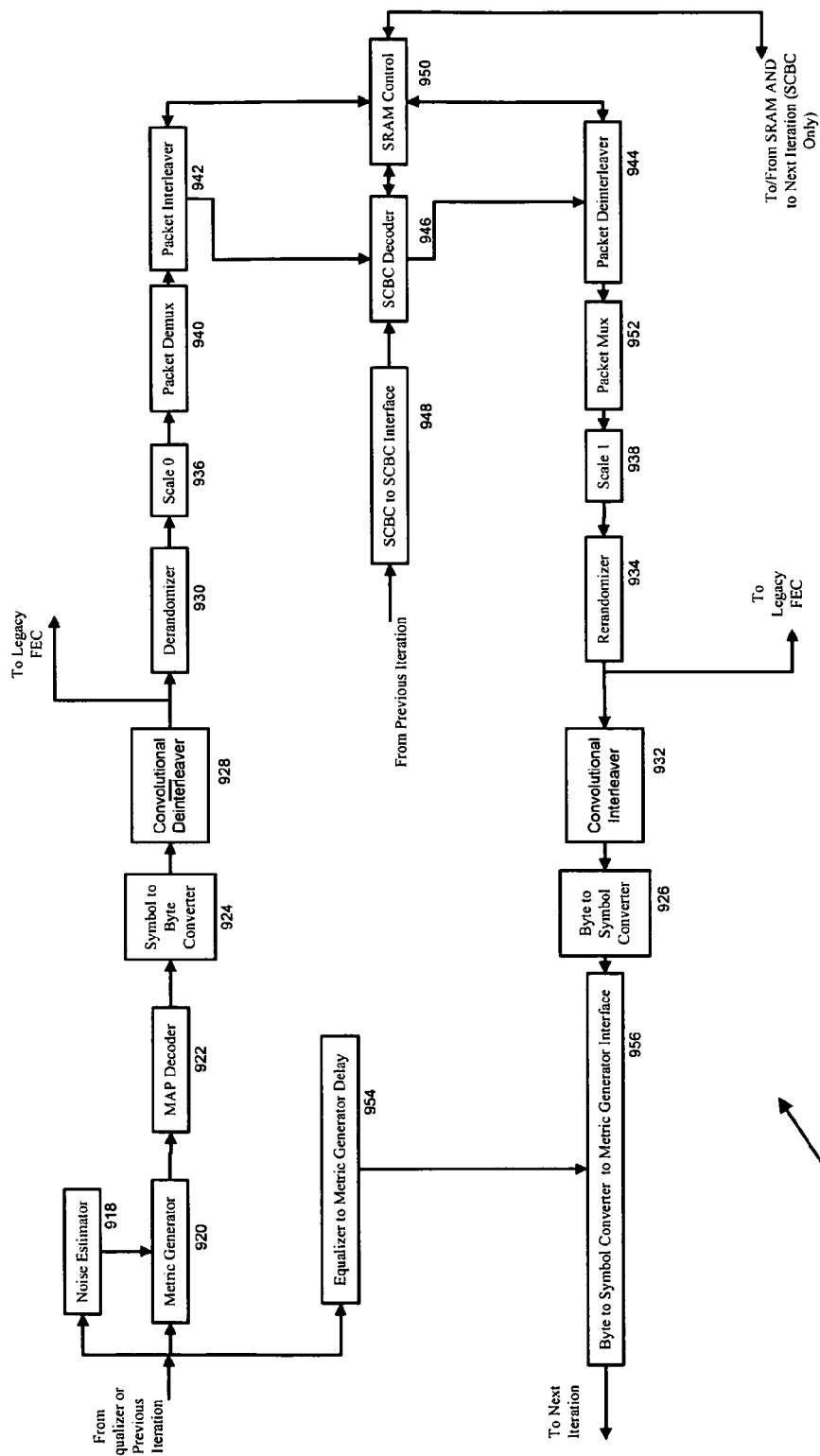
FIG. 11 depicts a block diagram of an HL FEC core according to the present arrangement.

FIG. 11 shows a block diagram of an HL FEC core 910. The input to each core consists of two streams: the first stream is the originally received stream (after demodulation and equalization), which is delayed and unaltered within each core to match the processing delay of the core and sent to the following core; and the second stream is a stream of extrinsic information associated with the received stream, as processed by the previous core. A noise estimator 918, metric generator 920 and MAP decoder 922 may be included in the HL FEC core, all of which are known in the art. Noise estimator 918 estimates the noise power in a received input stream to an HL FEC core. Metric generator 920 compares the symbols in the received input stream against the optimal 8-VSB values and calculates and stores the metrics needed by the MAP decoder, for the specific noise power. In addition, metric generator 920 calculates, stores and passes to the MAP decoder extrinsic information from the previous FEC core, also called a priori metrics. MAP decoder 922 decodes the ATSC trellis code with the metrics and the a priori metrics received from metric generator 920 and produces dual-bits.

Symbol to byte converter (S2B) 924 groups dual-bit outputs of MAP decoder 922 associated with each 8-VSB symbol in bytes (4 dual-bits per byte). The output of the MAP decoder is a soft decision version of a dual-bit, instead of 2 bits. For example, each dual-bit could be represented by 20 bits and a soft byte would then be represented by 80 bits. S2B 924 also converts the stream from symbol based to byte based.

Convolutional deinterleaver 928 is connected between S2B 924 and derandomizer 930. The convolutional deinterleaver 928 and derandomizer 930 have the same functionality as in the legacy ATSC standard as well as having the additional ability to handle soft bytes of more than 8 bits. Convolutional deinterleaver 928 rearranges the received data from a previously interleaved sequence. Derandomizer 930 derandomizes the received data to prepare the data for processing by scale 0 936.

Scale 0 936 scales the soft bytes of the data stream received from derandomizer 930 by a chosen factor. This factor is microprocessor controlled. The scaling factor can be between 0.5 and 1.0, varying for each core. Properly chosen values optimize performance of the HL FEC.

Packet demultiplexer 940 discards legacy ATSC data and only passes mobile data to the remaining blocks.

Packet interleaver 942 receives the signals from packet demultiplexer 940 and performs block interleaving operations associated with the GF(256) SCBC block code.

SCBC decoder 946 receives data from packet interleaver 942 and performs the block decoding operation for the GF (256) SCBC blocks, as discussed previously. SCBC decoder 946 handles soft bytes, and is also a soft decision block decoder.

SCBC-to-SCBC interface 948 connects two SCBC decoders from two adjacent cores in order to pass extrinsic information and control signals from one FEC core to the next.

SRAM control 950 interfaces the packet interleaver 942, packet deinterleaver 944 and SCBC decoder 946 to an SRAM needed to perform their respective functionalities.

Packet deinterleaver 944 receives data from SCBC decoder 946 and performs the block deinterleaving operations associated with the GF(256) SCBC block code.

Packet multiplexer 952 receives data from packet deinterleaver 944 and recreates a full stream with both legacy and mobile data by obtaining the mobile data from the extrinsic information received from the SCBC decoder block 946 (through the packet deinterleaver 944) and zeroing the legacy data, since it is not of interest to the mobile DTV decoder. The SCBC extrinsic information is used to enhance the performance of the MAP decoder of the subsequent core or iteration.

Scale 1 938 scales the soft bytes of the data stream received from packet multiplexer 952 by a chosen factor. This factor is microprocessor controlled. The scaling factor can be between 0.5 and 1.0, varying for each core. Properly chosen values optimize performance of the HL FEC.

Rerandomizer 934 is connected between scale 1 938 and convolutional interleaver 932. The rerandomizer 934 has the same functionality as in the legacy ATSC standard as well as the additional ability to handle soft bytes of more than 8 bits. Rerandomizer 934 randomizes the received data. Convolutional interleaver 932 rearranges the received data into a sequence that is less prone to long sequences of errors.

Byte-to-symbol converter (B2S) block 926 performs the inverse functionality of the S2B block 924. It separates a soft byte into soft dual-bits and converts the data from byte based to symbol based.

B2S to metric generator interface 956 obtains extrinsic information from B2S 926 and the delayed received input signals (data and sync) from the core input, and synchronizes these two sets of data with minimum latency and loss of data, outputting the two sets of data to the next core.

Equalizer to metric generator delay 954 delays the originally received data stream, field and segment sync, as well as other synchronization signals to match the overall latency of the current core blocks. In addition it passes a symbol enable from the input to the output of the core without delay.

The LL FEC core is a subset of the HL FEC core, where some of the blocks of the HL FEC core are replaced by a simpler functionality in order to decrease latency. As a result some portions of data are lost but the remaining extrinsic information must still be synchronized with the core input data and fed to the next core. The main differences between an LL FEC core and an HL FEC core are stated in the paragraph below.

The Metric generator and MAP decoder of the LL FEC core have a reduced latency, and therefore, lesser performance than in the HL FEC core. The convolutional deinterleaver, derandomizer, convolutional interleaver, (re)randomizer, packet demultiplexer, packet interleaver, packet deinterleaver, and packet multiplexer are not present in the LL FEC core and instead are replaced by different, simplified components that perform the operations of (de)randomizing and (re)randomizing as well as extracting the mobile data of interest, which is a subset of the entire mobile data. The SCBC decoder of the LL FEC core has a different code rate than the HL FEC code rate for the purpose of decreasing the latency of the core. In addition, the Equalizer to metric generator delay block of the LL FEC core has a smaller latency than in the HL FEC core.

Figure 12:
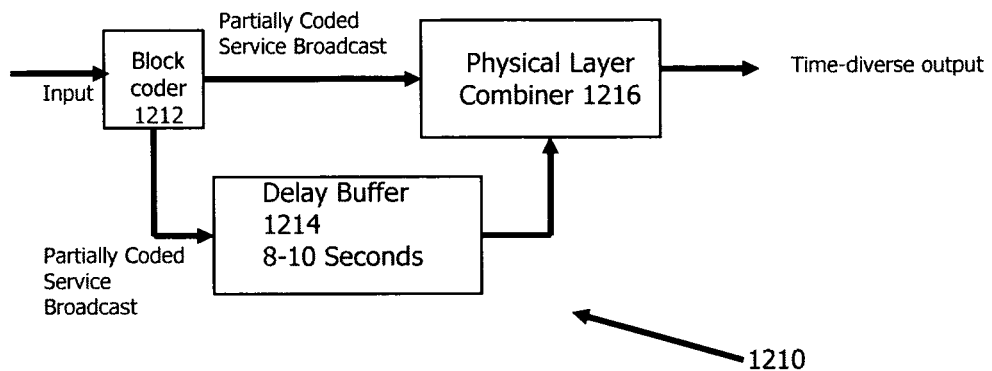
FIG. 12 depicts a mobile DTV system supporting time diversity according to the present arrangement.

FIG. 12 shows a mobile DTV system with time diversity 1210. As discussed, the mobile DTV system may be flexible enough for transmission with time diversity. The main flexibility comes from the structure of the GF (256) block code and separation of blocks of segments (or packets) of data into information and parity packets at block coder 1212 which can produce a partially coded service broadcast. An information block contains all information packets and possibly some parity packets. A parity block only contains parity packets. In addition, a parity block can be used to derive information packets. Specifically, a parity block contains a linear combination of all the information packets. These information or parity blocks can then be delayed with respect to each other. The delays can be within a range of 8 to 10 seconds before transmission by delay buffer 1214, as shown in FIG. 12, and regrouped in the receiver or physical layer combiner 1216 to obtain a robust system performance. The output of combiner 1216 is a robust time-diverse output. The information and parity blocks in the combiner 1216 output from the delayed and non-delayed paths can each be independently decoded for deep fades. Together, they provide maximum threshold performance.

The present arrangement provides a time diversity scheme associated with the data and parity blocks of packets of the GF (256) SCBC encoder. As an example, a code rate of R=12/52 is used, according to FIG. 4. Each codeword of 52 packets is split into two blocks of 26 packets: A and B blocks. The A block contains the 12 information packets (and 12 parity packets) and is hereby called an information block. The B block contains only parity packets and is hereby called a parity block. As a result, information (A) and parity (B) blocks in FIG. 4 are 26 packets each and serially transmitted, where A and B jointly compose a 52 packet block out of the SCBC encoder or the packet deinterleaver. The code rate R is exemplary and may be defined as a different value, which would also result in different sized A and B blocks.

The original stream without diversity at the input to the legacy ATSC transmitter can be represented as Data Stream (1):

$$|A(0)|B(0)|A(1)|B(1)|\ldots|A(L)|B(L)|A(L+1)|B(L+1)| \quad (1)$$

This is represented in FIG. 12 as the input to block coder 1212.

In order to add time diversity capability to the stream, the A and B blocks are first grouped in accordance with the size of a mobile field F0 in Table 1. For a mobile data structure with 156 packets per mobile field F0, this grouping is represented by 6 A or B blocks per field, creating Data Stream (2):

$$|A(0)|A(1)|A(2)|A(3)|A(4)|A(5)|B(0)|B(1)|B(2)|B(3)|B(4)|B(5)|A(6)|A(7)|A(8)|A(9)|A(10)|A(11)|B(6)|B(7)|B(8)|B(9)|B(10)|B(11)| \quad (2)$$

or equivalently Data Stream (3):

$$|AA(0)|BB(0)|AA(1)|BB(1)|\ldots|AA(L)|BB(L)|AA(L+1)|BB(L+1)| \quad (3)$$

where AA is a block of 6 As and BB is a block of 6 Bs. The BB blocks are delayed with respect to the AA blocks by feeding the BB blocks through delay buffer 1214 of FIG. 12, in order to create the following separate streams entering physical layer combiner 1216, represented by Data Streams (4):

$$|AA(0)|AA(1)|AA(2)|AA(3)|\ldots|AA(L)|AA(L+1)|AA(L+2)|AA(L+3)|\ldots| \rightarrow \text{Delay Buffer} \rightarrow |BB(-L)|BB(-L+1)|BB(-L+2)|BB(-L+3)|BB(0)|BB(1)|BB(2)|BB(3)| \quad (4)$$

where, in this case, the delay buffer has a delay of L×26 packets.

The AA and BB delayed streams are then combined at physical layer combiner 1216 by alternately taking a block from each stream to create the time diversity stream, which feeds the legacy ATSC transmitter, represented by Data Stream (5):

$$|AA(0)|BB(-L)|AA(1)|BB(-L+1)|\ldots|AA(L)|BB(0)|AA(L+1)|BB(1)| \quad (5)$$

The legacy ATSC transmitter has the ability to transfer the time diversity stream of Data Stream (5) to a receiver.

Figure 13:
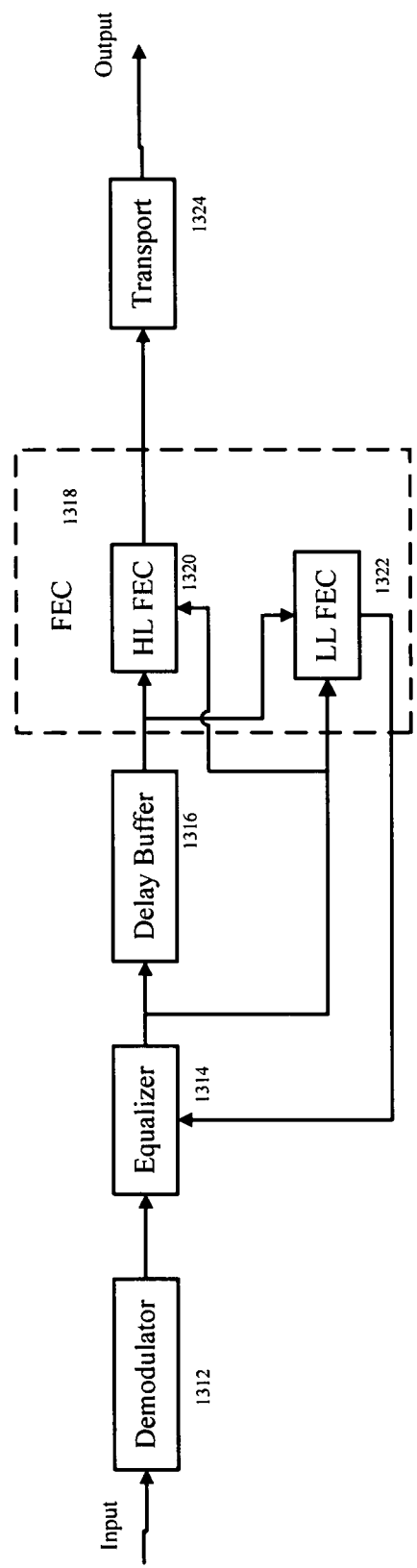
FIG. 13 depicts an example of a receiver implementation for a mobile DTV system with time diversity according to the present arrangement.
Figure 14:
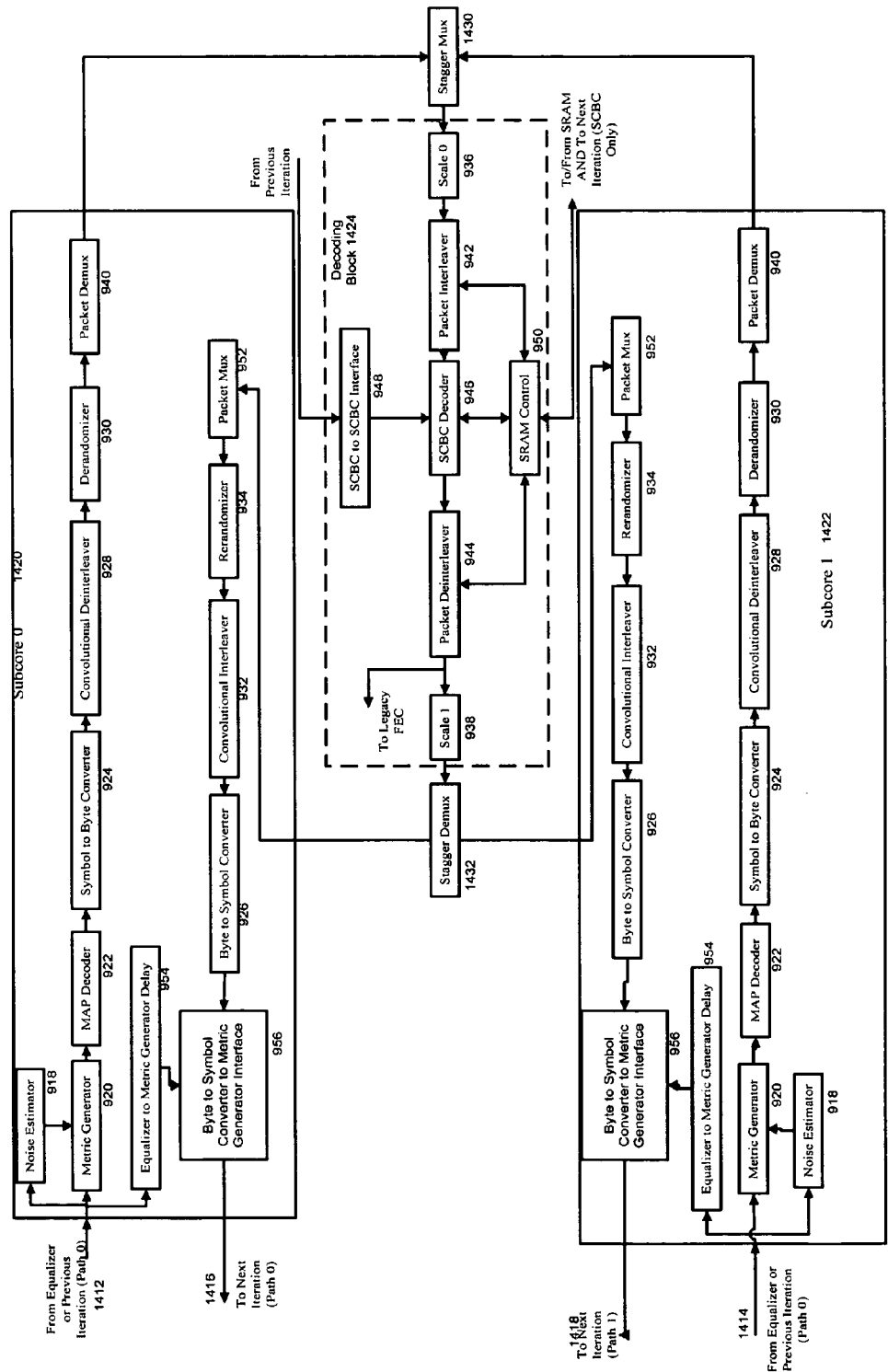
FIG. 14 depicts an HL FEC core supporting time diversity according to the present arrangement.

FIG. 13 shows a receiver implementation for the present arrangement. At the receiver, after demodulation at demodulator 1312 and equalization at equalizer 1314, delay buffer 1316 creates two versions of the transmitted stream, the first of which represents a delayed version of Data Stream (5), and the second which represents the original stream, Data Stream (5). These two versions are represented by Data Streams (6):

$$\rightarrow \text{Delay Buffer} \rightarrow |AA(0)|BB(-L)|AA(1)|BB(-L+1)|\ldots|AA(L)|BB(0)|AA(L+1)|\ldots$$
$$|AA(0)|BB(-L)|AA(1)|BB(-L+1)|\ldots|BB(0)|AA(L+1)|BB(1)||AA(L+2)|\ldots|BB(L)|AA(2L+1)|BB(L+1)| \quad (6)$$

where Delay Buffer 1316 has a length of (2×L)×26 packets. These two streams are then fed into the FEC decoding block 1318. The paragraphs below describe operation of the HL FEC core for the present arrangement, which exists as part of HL FEC 1320. Similar concepts apply to LL FEC 1322 since it can be seen as a subset of the HL FEC 1320. FIG. 14 shows the architecture for an HL FEC core that receives Data Streams (4) from Delay Buffer 1316 of FIG. 13. Two separate FEC encoded inputs, (Path 0) 1412 and (Path 1) 1414, represented by the two streams of Data Streams (4), enter the dual-stream decoder. The data stream identified as Path 0 passing through the Delay Buffer is received in Subcore 0 while Path 1 identified by the other data stream of Data Streams (4) is received by Subcore 1. In addition, two separate a priori output streams (Path 0) 1416 and (Path 1) 1418 are delivered from one FEC core to the next, as part of the iterative FEC decoding process.

Similar elements from FIG. 11 are also present in the FEC Core of FIG. 14 and only the blocks associated with the GF (256) SCBC code will see the recombined stream. All similar blocks are identified by the same reference numbers found in FIG. 11. The similar blocks in FIGS. 11 and 14 are associated with most legacy ATSC FEC decoder functionalities, including trellis decoding, convolutional deinterleaving and derandomizing, as well as the reencoding counterparts. FIG. 14 also includes decoding block 1428 which contains similar blocks to those discussed with respect to FIG. 11.

The operation of stagger multiplexer 1430 and stagger demultiplexer 1432 is set forth below.

The streams of Data Streams (4) are fed into inputs 1412 and 1414. The streams are then processed by subcore 0 1420 and subcore 1 1422, respectively, before reaching packet demultiplexer 1426. Stagger multiplexer 1430 receives Data Streams (6), and creates one stream of alternating AA blocks and zeros and another stream of alternating BB blocks and zeros, represented by Data Streams (7):

$$|AA(0)|0|AA(1)|0|\ldots|AA(L)|0|AA(L+1)|0|\ldots|BB(0)|0|BB(1)|0|\ldots|BB(L)|0|BB(L+1)|0| \quad (7)$$

This step is performed by extracting AA and BB blocks from the streams of Data Streams (6) and zeroing the bolded blocks in Data Streams (6), which together do not form meaningful A&B SCBC codewords. For example, AA(0)&BB(0) form a meaningful block of SCBC codewords, but AA(L)&BB(−L) or BB(−L)&AA(L+1) do not. In addition, stagger multiplexer 1430 may also deconstruct the grouping of 6 As and 6 Bs from Data Streams (7) and Data Streams (2), in order to regenerate the stream represented by Data Stream (8):

$$|A(0)|B(0)|A(1)|B(1)|\ldots|A(5)|B(5)|0|0|\ldots|A(L)|B(L)|A(L+1)|B(L+1) \quad (8)$$

The recreated stream is the same as the original stream represented by Data Stream (1), including embedded zeroes, ready to be delivered to decoding block 1424. Since zero is an SCBC codeword, it will pass unchanged through the remaining blocks in the chain.

Following decoding block 1424, stagger demultiplexer block 1432 receives the stream of Data Stream (8), and separates the A and B blocks of Data Stream (8). The blocks are regrouped to be representative of Data Stream (2) and used to generate data streams identical to Data Streams (7) in order to deliver the streams back to subcore 0 1420 and subcore 1 1422.

The grouping of A and B blocks dictates that the passing of extrinsic information from one FEC core to the next occurs as a continuous stream without interruption at the MAP decoder which results in a 0.8 dB gain in AWGN (Additive White Gaussian Noise) performance over an implementation where A and B blocks are not grouped. There is minimal loss in performance for the MAP decoder during that field of data. The loss in performance is only associated with the presence of legacy ATSC interspersed with the mobile ATSC data during the beginning and the end of the mobile data in field F0 of Table 1.

One skilled in the art may observe that increasing the grouping of As and Bs beyond 6 for this particular example does not increase the performance, but instead increases the latency of the receiver. This is because the mobile field F0 only contains 6 blocks of 26 packets. Thus, the size of the grouping of blocks is a function of the size of the mobile field.

Figure 15:
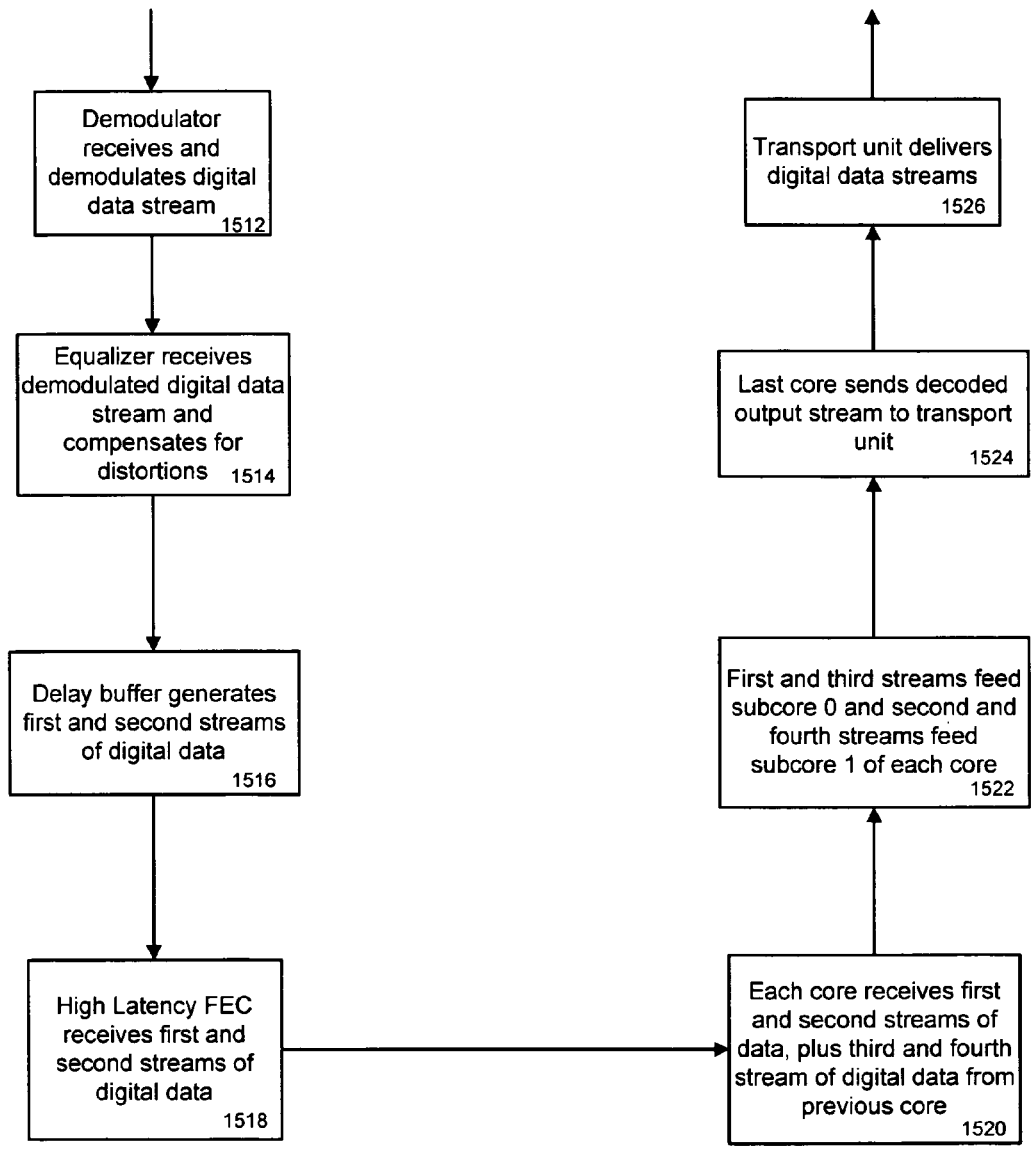
FIG. 15 depicts a flowchart of the steps taken by the HL FEC to decode digital data according to the present arrangement.

FIG. 15 depicts a flowchart detailing the steps taken by the present arrangement to decode digital data. At 1512, a demodulator receives and demodulates a digital data stream including information and parity blocks. At 1514, an equalizer receives the demodulated digital data stream and compensates for distortions. At 1516, a delay buffer generates a first stream of digital data representing a delayed version of the compensated digital data stream and a second stream of digital data representing the compensated digital data stream. At 1518, the first and second streams of digital data are received and processed by a high latency forward error correction unit including multiple cores. At 1520, each core receives the first and second streams of digital data appropriately delayed by the previous core to match its processing delay plus a third and a fourth stream of digital data corresponding to extrinsic information from the previous core. At 1522, the first and third streams feed subcore 0 and the second and fourth streams feed subcore 1. Each core generates a third and fourth output stream of digital data of extrinsic information. In addition, each core appropriately delays the first and second input data stream and outputs it to the following core as a first and a second output stream. At 1524, the last core sends its decoded output stream (from the output of 844) to a Legacy ATSC FEC unit which in turn outputs an error decoded MPEG stream to the transport unit. Finally, at 1526, the transport unit delivers video/audio streams to a DTV display.

The time diversity scheme described above may be extended to include frequency diversity if, for example, the A blocks are transmitted in one frequency and the B blocks in another frequency. At the receiver, those two frequencies would be demodulated and the streams regrouped into Data Stream (5) prior to FEC decoding.

Although the arrangement has been described in terms of exemplary embodiments, it is not limited thereto. Rather, the appended claims should be construed broadly to include other variants and embodiments of the arrangement which may be made by those skilled in the art without departing from the scope and range of equivalents of the arrangement. This disclosure is intended to cover any adaptations or variations of the embodiments discussed herein.

The invention claimed is:

1. An apparatus for receiving a digital data stream comprising:
a demodulator that receives the digital data stream and demodulates the digital data stream, the digital data stream comprising alternating groups of information blocks and groups of parity blocks, each block comprising a plurality of packets, each packet comprising 187 bytes, each group of information blocks being followed by a group of parity blocks, each group of parity blocks being followed by a group of information blocks, each group of information blocks including a plurality of information blocks and each group of parity blocks including a plurality of parity blocks, wherein each parity block contains only parity packets;
an equalizer, that compensates for distortions in the digital data stream to generate a compensated digital data stream;
a delay buffer, that generates a first stream of digital data representing the compensated digital data stream and a second stream of digital data representing the compensated digital data stream delayed for a delay period;
a forward error correction block, that receives and processes the first and second streams of digital data from the delay buffer, and outputs an error corrected stream of digital data, wherein a first information block in the group of information blocks and a corresponding first parity block in the group of parity blocks together form a potential codeword for an error correction serial concatenated packet block code and the delay buffer and forward error correction block align said first information block in the first stream of digital data with said corresponding first parity block in the second stream of digital data for decoding in a packet block decoder; and
a transport block, that receives and processes the error corrected stream from the forward error correction block for display.

2. The apparatus of claim 1, wherein the forward error correction block comprises a plurality of forward error correction cores, a first core of the plurality of forward error correction cores comprising:
a first subcore, that processes the first stream of digital data;
a second subcore, that processes the second stream of digital data;
a stagger multiplexer, that generates a combined stream of digital data from the first and second processed streams of digital data; and
a stagger demultiplexer, that processes the combined stream of digital data to generate two streams of extrinsic digital data;
wherein the first subcore further processes one stream of extrinsic digital data to output a third digital data stream, the second subcore further processes the other stream of extrinsic digital data to output a fourth digital data stream, and the first and third streams are provided to a first subcore of a subsequent forward error correction core of the plurality of forward error correction cores and the second and fourth streams are provided to a second subcore of the subsequent forward error correction core.

3. The apparatus of claim 2, wherein the stagger multiplexer generates a first intermediate stream by extracting groups of parity blocks from the first stream of digital data and inserting a zero block in place of each group of parity blocks and generates a second intermediate stream by extracting groups of information blocks from the second stream of digital data and inserting a zero block in place of each group of information blocks;

wherein the combined stream of digital data is generated by alternately extracting an individual information block from the first intermediate stream of digital data and an individual parity block from the second intermediate stream of digital data.

4. The apparatus of claim 2, wherein the stagger demultiplexer generates the one stream of extrinsic digital data by extracting individual information blocks from the combined stream of digital data to form groups of information blocks with zero blocks between each group of information blocks and generates the other stream of extrinsic digital data by extracting individual parity blocks from the combined stream of digital data to form groups of parity blocks with zero blocks between each group of parity blocks.

5. The apparatus of claim 2, wherein each of the plurality of forward error correction cores comprises:

a first subcore, that processes the first and third streams of digital data;

a second subcore, that processes the second and fourth streams of digital data;

a stagger multiplexer, that generates a combined stream of digital data from the first and second processed streams of digital data; and a stagger demultiplexer, that processes the combined stream of digital data to generate two streams of extrinsic digital data;

wherein the first subcore further processes one stream of extrinsic digital data to output a third digital data stream, the second subcore further processes the other stream of extrinsic digital data to output a fourth digital data stream, and the first and third streams are provided to a first subcore of a subsequent forward error correction core of the plurality of forward error correction cores and the second and fourth streams are provided to a second subcore of the subsequent forward error correction core.

6. The apparatus of claim 2, wherein the forward error correction block comprises a last core comprising:

a first subcore, that processes the first and third streams of digital data;

a second subcore, that processes the second and fourth streams of digital data;

a stagger multiplexer, that generates a combined stream of digital data from the first and second processed streams of digital data; and a decoding block, that processes the combined stream of digital data and outputs the combined stream of digital data as the error corrected stream of digital data.

7. The apparatus of claim 5, wherein the forward error correction block comprises a last core comprising:

a first subcore, that processes the first and third streams of digital data;

a second subcore, that processes the second and fourth streams of digital data;

a stagger multiplexer, that generates a combined stream of digital data from the first and second processed streams of digital data; and a decoding block, that processes the combined stream of digital data and outputs the combined stream of digital data as the error corrected stream of digital data.

8. The apparatus of claim 2, wherein the forward error correction block further comprises a forward error correction core that processes the first and second streams of digital data to generate a reencoded data stream, the reencoded data stream being provided to the equalizer.

9. An apparatus for decoding a digital data stream comprising:

a first subcore, that processes a first stream of digital data producing a first processed stream of digital data, the digital data stream comprising alternating groups of information blocks and groups of parity blocks, each block comprising a plurality of packets, each packet comprising 187 bytes, each group of information blocks being followed by a group of parity blocks, each group of parity blocks being followed by a group of information blocks, each group of information blocks including a plurality of information blocks and each group of parity blocks including a plurality of parity blocks, wherein each parity block contains only parity packets;

a second subcore, that processes a second stream of digital data producing a second processed stream of digital data;

a stagger multiplexer, that generates a combined stream of digital data from the first and second processed streams of digital data, wherein a first information block in the group of information blocks and a corresponding first parity block in the group of parity blocks together form a potential codeword for an error correction serial concatenated packet block code and said first information block in the first stream of digital data is aligned with said corresponding first parity block in the second stream of digital data for decoding in a packet block decoder; and a stagger demultiplexer, that processes the combined stream of digital data to generate a first stream and a second stream of extrinsic digital data;

wherein the first subcore further processes the first stream of extrinsic digital data to output a third digital data stream, the second subcore further processes the second stream of extrinsic digital data to output a fourth digital data stream, and the first and third streams are provided to a first subcore of a subsequent forward error correction core of the plurality of forward error correction cores and the second and fourth streams are provided to a second subcore of the subsequent forward error correction core.

10. The apparatus of claim 9, wherein the stagger multiplexer generates a first intermediate stream by extracting groups of parity blocks from the first stream of digital data and inserting a zero block in place of each group of parity blocks and generates a second intermediate stream by extracting groups of information blocks from the second stream of digital data and inserting a zero block in place of each group of information blocks;

wherein the combined stream of digital data is generated by alternately extracting an individual information block from the first intermediate stream of digital data and an individual parity block from the second intermediate stream of digital data.

11. The apparatus of claim 9, wherein the stagger demultiplexer generates the one stream of extrinsic digital data by extracting individual information blocks from the combined stream of digital data to form groups of information blocks with zero blocks between each group of information blocks and generates the other stream of extrinsic digital data by extracting individual parity blocks from the combined stream of digital data to form groups of parity blocks with zero blocks between each group of parity blocks.

12. A method for receiving a digital data stream comprising:
demodulating, in a demodulator, the digital data stream producing a demodulated digital data stream, the digital data stream comprising alternating groups of information blocks and groups of parity blocks, each block comprising a plurality of packets, each packet comprising 187 bytes, each group of information blocks being followed by a group of parity blocks, each group of parity blocks being followed by a group of information blocks, each group of information blocks including a plurality of information blocks and each group of parity blocks including a plurality of parity blocks, wherein each parity block contains only parity packets;
compensating, with an equalizer, the demodulated digital data stream for distortions producing a compensated digital data stream;
generating, with a delay buffer, a first stream of digital data representing the compensated digital data stream and a second stream of digital data representing the compensated digital data stream delayed for a delay period;
processing, with a forward error correction block, the first and second streams of digital data to generate an error corrected stream of digital data, wherein a first information block in the group of information blocks and a corresponding first parity block in the group of parity blocks together form a potential codeword for an error correction serial concatenated packet block code and the forward error correction block aligns said first information block in the first stream of digital data with said corresponding first parity block in the second stream of digital data for decoding in a packet block decoder;
transmitting, the error corrected stream of digital data for display.

13. The method of claim 12, wherein the processing comprises processing the first and second streams of digital data with a plurality of forward error correction cores.

14. The method of claim 13, wherein the processing comprises:
processing, the first and second streams of digital data;
generating, in a stagger multiplexer, a combined stream of digital data from the first and second processed streams;
generating, in a stagger demultiplexer, a first stream and a second stream of extrinsic digital data from the combined stream of digital data;
processing, in the first subcore, the first stream of extrinsic digital data to output a third digital data stream;
processing, in the second subcore, the second stream of extrinsic digital data to output a fourth digital data stream;
outputting the first and third streams of digital data to a first subcore of one of a plurality of forward error correction cores; and
outputting the second and fourth streams of digital data to a second subcore of the one of the plurality of forward error correction cores.

15. The method of claim 14, wherein generating, in a stagger multiplexer, comprises:
extracting groups of parity blocks from the first stream of digital data and inserting a zero block in place of each group of parity blocks to form a first intermediate stream of digital data;
extracting groups of information blocks from the second stream of digital data and inserting a zero block in place of each group of information blocks to form a second intermediate stream of digital data;
alternately extracting an individual information block from the first intermediate stream of digital data and an individual parity block from the second intermediate stream of digital data producing extracted individual blocks; and
combining the extracted individual blocks to form the combined stream of digital data.

16. The method of claim 14, wherein the generating, in a stagger demultiplexer, comprises:
extracting individual information blocks from the combined stream of digital data to form groups of information blocks and placing zero blocks between each group of information blocks to generate one stream of extrinsic data;
extracting individual parity blocks from the combined stream of digital data to form groups of parity blocks and placing zero blocks between each group of parity blocks to generate the second stream of extrinsic data.

17. The method of claim 12, wherein the processing with a forward error correction block, in a last core, comprises:
processing in a first subcore, the first and third streams of digital data;
processing, in a second subcore, the second and fourth streams of digital data;
generating, in a stagger multiplexer, a combined stream of digital data from the first and second processed streams of digital data; and
processing, in a decoding block, the combined stream of digital data and outputting the combined stream of digital data as the error corrected stream of digital data.

18. The method of claim 12, further comprising:
processing the first and second streams of digital data to generate a reencoded data stream, the reencoded data stream being provided to the equalizer.

19. A method for decoding a digital data stream comprising:
processing, in a first subcore, a first stream of digital data producing a first processed stream of digital data, the digital data stream comprising alternating groups of information blocks and groups of parity blocks, each block comprising a plurality of packets, each packet comprising 187 bytes, each group of information blocks being followed by a group of parity blocks, each group of parity blocks being followed by a group of information blocks, each group of information blocks including a plurality of information blocks and each group of parity blocks including a plurality of parity blocks, wherein each parity block contains only parity packets;
processing, in a second subcore, a second stream of digital data producing a second processed stream of digital data;
generating, in a stagger multiplexer, a combined stream of digital data from the first and second processed streams of digital data, wherein a first information block in the group of information blocks and a corresponding first parity block in the group of parity blocks together form a potential codeword for an error correction serial concatenated packet block code and said first information block in the first stream of digital data is aligned with said corresponding first parity block in the second stream of digital data for decoding in a packet block decoder; and processing, in a stagger demultiplexer, the combined stream of digital data to generate a first stream and a second stream of extrinsic digital data, further comprising:

generating the one stream of extrinsic digital data by extracting individual information blocks from the combined stream of digital data to form groups of information blocks with zero blocks between each group of information blocks; and generating the other stream of extrinsic digital data by extracting individual parity blocks from the combined stream of digital data to form groups of parity blocks with zero blocks between each group of parity blocks, further comprising;

processing, in the first subcore the first stream of extrinsic digital data to output a third digital data stream;

processing, in the second subcore, the second stream of extrinsic digital data to output a fourth digital data stream; and providing the first and third streams to a first subcore of a subsequent forward error correction core of the plurality of forward error correction cores, and the second and fourth streams to a second subcore of the subsequent forward error correction core.

20. The method of claim 19, wherein generating in the stagger multiplexer further comprises:

generating a first intermediate stream by extracting groups of parity blocks from the first stream of digital data and inserting a zero block in place of each group of parity blocks; and generating a second intermediate stream by extracting groups of information blocks from the second stream of digital data and inserting a zero block in place of each group of information blocks;

wherein the combined stream of digital data is generated by alternately extracting an individual information block from the first intermediate stream of digital data and an individual parity block from the second intermediate stream of digital data.

* * * * *